Figure 1:
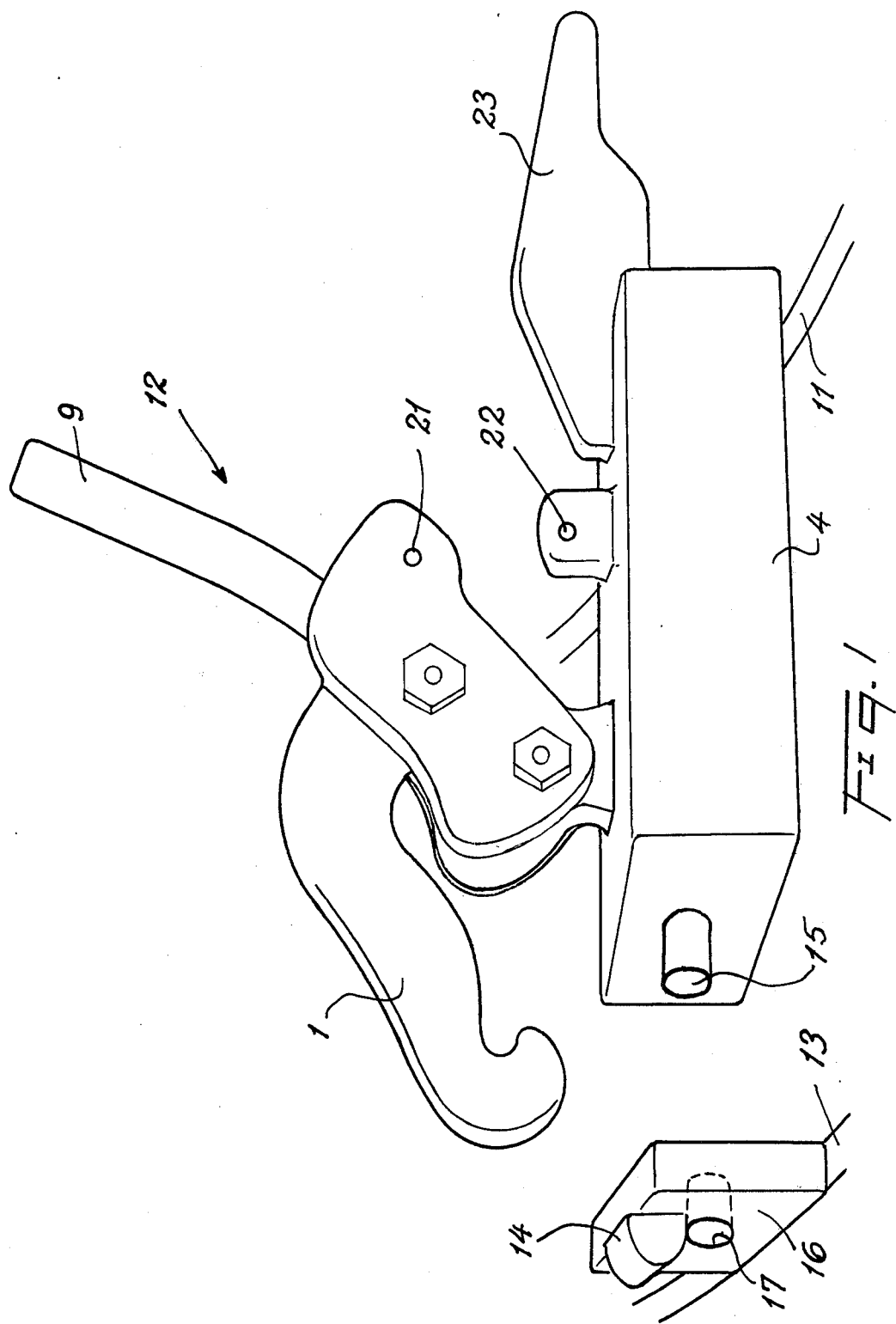

United States Patent [19]

Nielsen

[11] 4,127,305
[45] Nov. 28, 1978

[54] COUPLING DEVICE FOR TRACTOR TWIN WHEELS

[76] Inventor: Kjeld R. Nielsen, Tofteaasvej 10 g, Benløse, 4100 Ringsted, Denmark

[21] Appl. No.: 757,855

[22] Filed: Jan. 10, 1977

[30] Foreign Application Priority Data

Jan. 10, 1976 [GB] United Kingdom ............... 00937/76

[51] Int. Cl.² ............................................. B60B 11/00
[52] U.S. Cl. .................................. 301/36 R; 292/113; 403/14
[58] Field of Search .................... 301/36, 11 R, 13 R, 301/13 SM, 25, 29, 38 R, 38 S; 285/320, 310–312; 403/14, 344; 292/113, DIG. 39, DIG. 40, DIG. 49; 24/270, 68, 68 T

[56] References Cited

U.S. PATENT DOCUMENTS

| 3,030,137 | 4/1962 | Cheney ............................... 292/113 |
| 3,532,383 | 10/1970 | Unverferth et al. ............... 301/11 R |

Primary Examiner—Robert B. Reeves
Assistant Examiner—H. Grant Skaggs
Attorney, Agent, or Firm—Burns, Doane, Swecker & Mathis

[57] ABSTRACT

A twin wheel coupling device includes a plurality of spaced knee lever mechanisms carried on supports attached to an additional wheel to be locked together with the permanent wheel of a tractor. Spaced lugs attached to the permanent wheel rim are provided with projections engageable with hooks of the knee lever mechanisms. Laterally extending pins carried by the supports of the knee lever mechanisms engage in holes provided in the lugs.

2 Claims, 2 Drawing Figures

COUPLING DEVICE FOR TRACTOR TWIN WHEELS

BACKGROUND OF THE INVENTION

This invention relates to a coupling device for twin wheels for tractors and other vehicles.

Twin wheels are often desirable for tractors because they distribute the tractor's weight over a greater surface. They should, however, be easily and quickly detachable when the tractor has to circulate on public roads because otherwise the tractor's width exceeds the maximum allowed vehicle width.

OBJECTS AND SUMMARY OF PREFERRED EMBODIMENT OF THE INVENTION

Known tractor twin wheels are not easily mountable and detachable. The purpose of the present invention is to eliminate this drawback.

According to the present invention, to provide a twin wheel a plurality of circumferentially spaced knee lever mechanisms are carried on supports attached to one of the rims of the additional wheel and permanent wheel that are to be locked together. Each of the knee lever mechanisms is provided with a hook and a maneuvering bar.

Lugs are attached to the other wheel rim. Each lug is provided with a hole and a projection engageable with a corresponding hook of one of the knee lever mchanisms.

Laterally extending, circumferentially spaced pins associated with one rim are engageable in holes associated with the other rim. During coupling, the two wheels are placed near each other, and the knee lever mechanisms associated with one rim are brought into engagement with the projections associated with the other rim. The pins thereupon center themselves in the holes.

Preferably, the knee lever mechanisms are carried by the rim of the additional wheel and the supports for the knee lever mechanisms are provided with the pins. The lugs attached to the rim of the permanent wheel are accordingly provided with the projections engageable with the hooks of the knee lever mechanisms and with the holes engageable with the pins. This avoids the persence of disturbing protrusions from the permanent wheels of the tractor.

THE DRAWINGS

Figure 2:
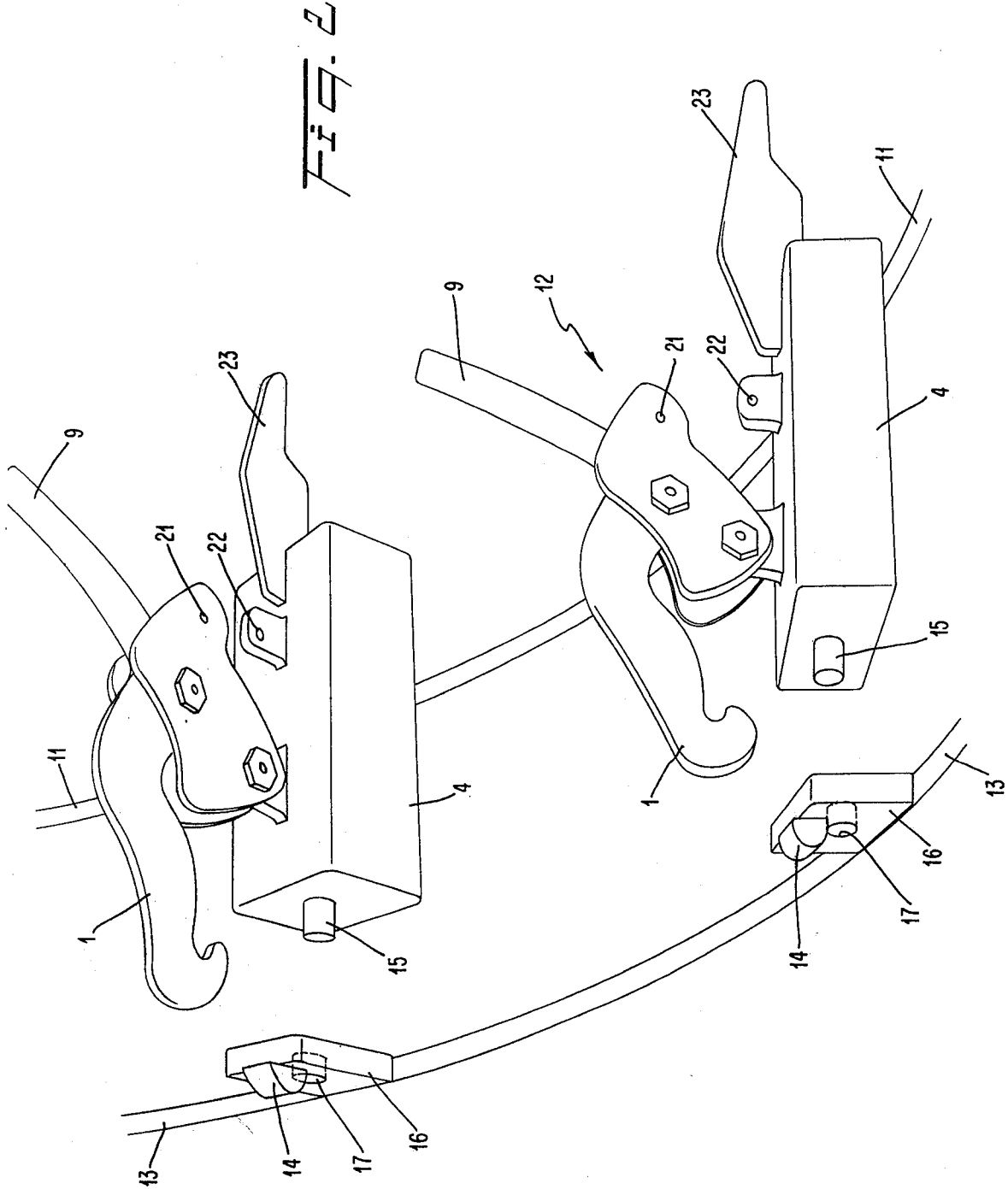

The invention is further described in the following with reference to the drawings wherein:

FIG. 1 is a perspective view depicting one coupling unit of a coupling device according to the present invention associated with partially shown rims of the permanent and additional wheels; and FIG. 2 is a smaller scale view illustrating a plurality of coupling units spaced evenly along the peripheries of the rims.

In FIG. 1 13 is the rim of a permanent wheel of a tractor, and 11 is the rim of an additional wheel to be locked together with the permanent wheel for obtaining a twin wheel.

On the rim 11 is attached, normally by welding, a support 4 which carries a knee lever mechanism 12 comprising a maneuvering bar 9 and a hook 1.

On the permanent wheel rim 13 is attached, e.g. by welding, a lug 16 having a projection 14 and a hole 17.

A number — typically 5 — of coupling units, each comprising a knee lever mechanism 12 and lug 16 with a projection 14 and a hole 17, are evenly distributed along the periphery of the rims 11 and 13, respectively. (See FIG. 2.)

When coupling together the additional wheel with its rim 11 to the permanent wheel with its rim 13, the two wheels are placed close to each other and the mechanisms 12 are brought, one by one, laterally into engagement with a respective projection 14. Thereby each of a number of pins 15 engages with a respective hole 17, each pin 15 centering itself in its said hole 17.

An eyelet 21 on the movable part of the knee lever mechanism 12 and a corresponding eyelet 22 on the support 4 may be deviced for receiving a split pin (not shown).

The support 4 may furthermore carry a strength-enhancing element 23.

I claim:

1. A coupling device operable to couple two tractor wheels, comprising:
    a wheel rim carrying a plurality of circumferentially spaced knee lever mechanisms each comprising a maneuvering bar and a hook;
    a second wheel rim carrying a plurality of circumferentially spaced projections each operable to laterally engage with a respective one of said hooks;
    a plurality of circumferentially spaced, laterally facing holes associated with one of said rims; and
    a plurality of circumferentially spaced, laterally extending pins carried by the other of said rims, which also carries said knee lever mechanisms, each operable to receive one of said pins.

2. A coupling device operable to couple two tractor wheels, comprising:
    a first wheel rim having a plurality of knee lever mechanisms, each comprising a maneuvering bar and a hook, disposed thereabout in circumferentially spaced relation;
    a plurality of circumferentially spaced, laterally extending supports for said knee lever mechanisms attached to said first wheel rim;
    a plurality of laterally extending pins projecting outwardly, one each from said supports;
    a second wheel rim; and
    a plurality of circumferentially spaced lugs, each having a projection cooperable with one of said hooks and a hole cooperable with one of said pins, attached to said second wheel rim.

* * * * *